(12) United States Patent
Restrepo et al.

(10) Patent No.: US 9,153,980 B2
(45) Date of Patent: Oct. 6, 2015

(54) PORTABLE ELECTRIC VEHICLE RECHARGING DEVICE

(75) Inventors: Carlos Eduardo Restrepo, Atlanta, GA (US); Luis F. Salas, Fayetteville, GA (US)

(73) Assignee: Cooper Technologies Company, Houston, TX (US)

( * ) Notice: Subject to any disclaimer, the term of this patent is extended or adjusted under 35 U.S.C. 154(b) by 714 days.

(21) Appl. No.: 13/446,148

(22) Filed: Apr. 13, 2012

(65) Prior Publication Data

US 2013/0271075 A1 Oct. 17, 2013

(51) Int. Cl.
  *H02J 7/00* (2006.01)
  *B60L 11/18* (2006.01)
  *H01R 31/06* (2006.01)
  *H01R 13/58* (2006.01)
  *H01R 24/30* (2011.01)

(52) U.S. Cl.
  CPC ........... *H02J 7/0042* (2013.01); *B60L 11/1818* (2013.01); *H01R 31/065* (2013.01); *H02J 7/0047* (2013.01); *B60L 2230/12* (2013.01); *H01R 13/5841* (2013.01); *H01R 24/30* (2013.01); *H01R 2201/26* (2013.01); *H02J 2007/0049* (2013.01); *Y02T 10/7088* (2013.01); *Y02T 90/12* (2013.01); *Y02T 90/121* (2013.01)

(58) Field of Classification Search
  CPC ....................................................... Y02T 90/14
  USPC .......................................................... 320/109
  See application file for complete search history.

(56) References Cited

U.S. PATENT DOCUMENTS

| | | | |
|---|---|---|---|
| 5,545,049 A * | 8/1996 | Hasegawa et al. | 439/310 |
| 5,614,808 A * | 3/1997 | Konoya et al. | 320/109 |
| 5,637,863 A | 6/1997 | Sanborn et al. | |
| 6,203,355 B1 * | 3/2001 | Neblett et al. | 439/372 |
| 8,025,526 B1 * | 9/2011 | Tormey et al. | 439/528 |
| 2005/0121602 A1 | 6/2005 | Peng et al. | |
| 2010/0241299 A1 * | 9/2010 | Ito et al. | 701/22 |
| 2011/0169447 A1 * | 7/2011 | Brown et al. | 320/109 |
| 2011/0172839 A1 * | 7/2011 | Brown et al. | 700/292 |

* cited by examiner

*Primary Examiner* — Yalkew Fantu
(74) *Attorney, Agent, or Firm* — King & Spalding LLP (57) ABSTRACT

An electrical vehicle recharging device includes an electric vehicle connector. The electric vehicle connector complies with the SAE J1772 standard and includes a first end configured to be coupled to a receptacle on an electric vehicle to recharge the batteries of that vehicle and a second end that includes a handle. The device also include a charger housing that is positioned immediately next to and coupled to the electric vehicle connector and includes an electric vehicle charging circuit positioned within the charger housing. The device further includes a power cable having a first end and a distal second end. The first end of the power cable is coupled to the electric vehicle charging circuit and the second end is coupled to an electrical plug configured to be removably coupled to a surface-mounted electrical receptacle to provide a source of power to the device for recharging the electric vehicle.

20 Claims, 9 Drawing Sheets

PORTABLE ELECTRIC VEHICLE RECHARGING DEVICE

TECHNICAL FIELD

The present disclosure relates generally to the field of electric vehicle recharging. More specifically, the present disclosure relates to systems, methods and apparatuses for a portable electric vehicle recharging device.

BACKGROUND

All-electric and hybrid-electric vehicles store electrical power in a storage device, such as a battery for example. The electrical power is then drawn upon by the vehicle to be converted into useful work, such as by powering motors that are connected to the vehicle's wheels. In some vehicles, such as hybrid-electric vehicles for example, the energy stored in the battery is generated by a gasoline fueled engine. The engine rotates an electrical generator that produces electrical power. The electrical power may also be generated using other means such as regenerative braking, which converts the energy dissipated during the braking and slowing down of the vehicle into electrical energy for example.

The all-electric vehicle, which lacks an independently fueled engine, relies on an external power source to provide the energy stored in the battery. The all-electric vehicle includes a receptacle that allows the operator to couple the vehicle to a utility-grid connected electrical circuit. Electrical power is transferred from the grid connected electrical circuit to the vehicle for recharging the batteries. Some all-electric vehicles may also incorporate regenerative braking features as well. A third type of vehicle, the plug-in hybrid electric ("PHEV") includes an engine for generating power during operation, but also incorporates a receptacle to allow the operator to recharge the battery when the vehicle is not in use.

Figure 1:
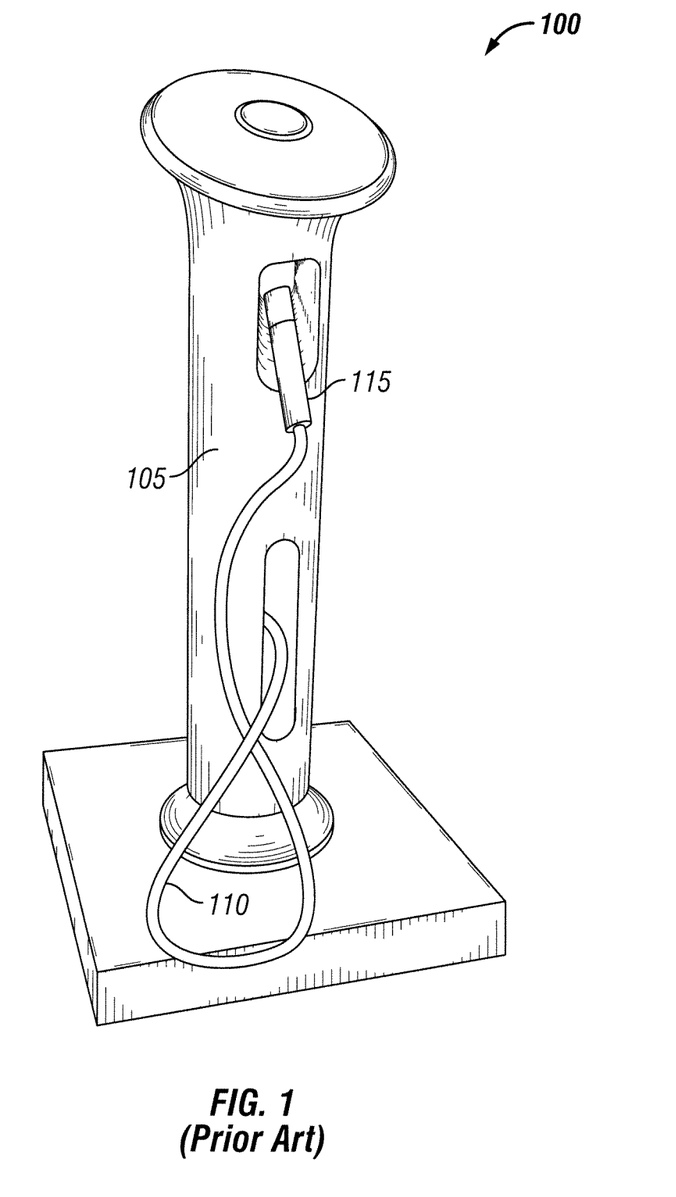
FIG. 1 illustrates a conventional EV charging stand in accordance with the prior art.

For example, FIG. 1 illustrates a typical arrangement for a conventional electric vehicle charging stand 100 for providing electricity to an electric vehicle. The conventional electric vehicle (EV) charging stand 100 includes an upright housing or stand 105 that is mounted to the ground or some other surface. The EV charging stand 100 is hard-wired to an electrical grid to receive a source of electricity to be provided to the electric vehicle. The EV charging stand 100 provides electricity to an electric vehicle through a cord 110 and a plug connector 115 that plugs into a corresponding plug receptacle on the electric vehicle.

Figure 2:
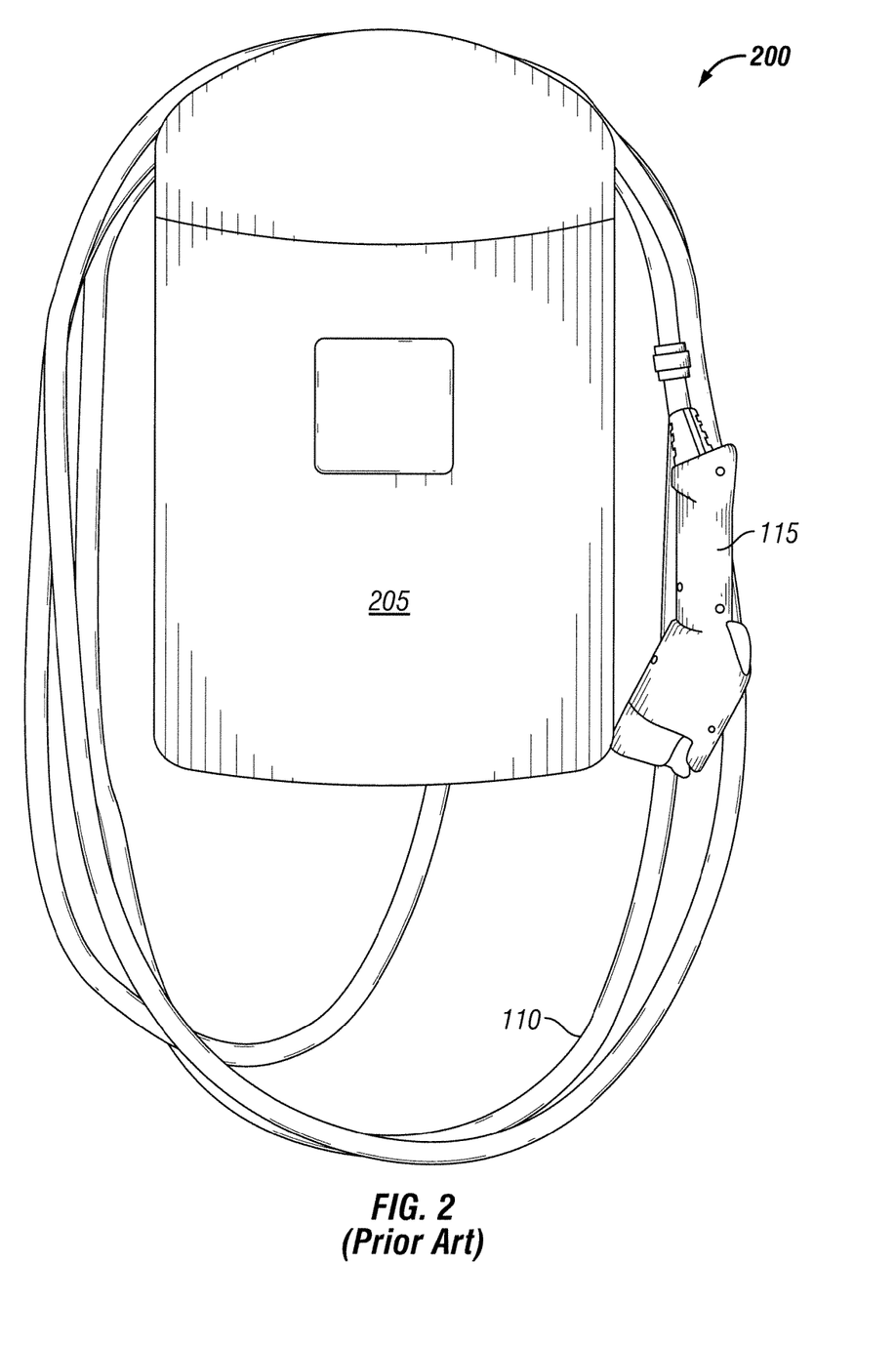
FIG. 2 illustrates a conventional wall-mounted EV charging station in accordance with the prior art.

FIG. 2 illustrates an alternative conventional arrangement for charging electric vehicles by providing a wall-mounted EV charger 200. The wall-mounted EV charger 200 is mounted to a wall or other similar surface and is typically hard wired to an electrical grid. Alternatively, the wall-mounted EV charger 200 may include a plug along the back side of the housing 205 to electrically couple the charger 200 to a source of electricity through a receptacle. The wall mounted EV charger 200 includes a housing 205 that includes electrical components for providing electricity to the electric vehicle.

In addition, similar to the EV charging stand 100, the wall-mounted EV charger 200 also includes a cord 110 electrically coupled to a plug connector 115 that plugs into a corresponding plug receptacle on the electric vehicle to provide electricity to the vehicle.

In an effort to promote standardization and interoperability, standards have been proposed, such as the J1772 standard promoted by the Society of Automotive Engineers (SAE) for example, that establish defined receptacle parameters and protocols. The J1772 standard provides three different levels of charging. The charging level depends on the capability of the vehicle to receive electrical power and the ability of the electrical circuit to deliver the power.

Level 1 charging allows the vehicle to receive electrical power from a 110 volt, 15-ampere circuit, such as that found in a common residential circuit. Level 1 charging provides an advantage in allowing the operator to connect in many locations using standard circuits, such as those commonly found in a residential garage. However, due to the low power capacity of these electrical circuits, an electric vehicle requires 24-26 hours to fully charge. A Level 2 designated charge allows the vehicle to receive electrical power from a 220V, 30 ampere circuit for example. The Level 2 charge will typically recharge a vehicle battery in three to six hours. These 220V circuits are found in some residences and may be used for certain existing appliances, such as a clothes dryer for example.

A third charging protocol, known as a Level 3 charge, provides for charging the vehicle using a 440V circuit. The charging of the vehicle on a Level 3 circuit allows the charging of the vehicle battery in two to three hours. Residences with circuits capable of Level 3 charging are not yet common and are typically only available at commercial establishments.

SUMMARY

According to one exemplary embodiment, an electrical vehicle recharging system can include an electric vehicle connector. The electric vehicle connector can be configured in such a way as to comply with the SAE J 1772 standard and can include a first end and a second end. The first end of the electric vehicle connector can be configured to be coupled to a receptacle on an electric vehicle to recharge the batteries of that vehicle. The system can also include a charger housing that is positioned immediately next to and coupled to the electric vehicle connector. The charger housing can include an electric vehicle charging circuit that in positioned within the charger housing. The system can also include a power cable having a first end and a distal second end. The first end of the power cable can be coupled to the electric vehicle charging circuit. In addition, the system can include an electrical plug that is coupled to the second end of the power cable.

According to another exemplary embodiment, an electrical vehicle recharging system can include an electric vehicle connector. The electric vehicle connector can be configured in such a way as to comply with the SAE J1772 standard and can include a first end and a second end. The first end of the electric vehicle connector can include a terminal interface having multiple conductive terminals that are configured to be coupled to a receptacle on an electric vehicle to recharge the batteries of that vehicle. The second end of the electric vehicle connector can include a handle for grasping and positioning the connector. The system can also include a charger housing that is positioned immediately next to and rotatably coupled to the electric vehicle connector. The charger housing can include an electric vehicle charging circuit that in positioned within the charger housing. The system can also include a power cable having a first end and a distal second end. The first end of the power cable can be coupled to the electric vehicle charging circuit. In addition, the system can include an electrical plug that is coupled to the second end of the power cable.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the present invention and the advantages thereof, reference is now made to the following description in conjunction with the accompanying figures in which.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements throughout the several views.

BRIEF DESCRIPTION OF EXEMPLARY EMBODIMENTS

The present disclosure is directed to a portable EV recharging device. In particular, the disclosure is directed to a portable EV recharging device that is capable of being plugged into standard 110V and 220V electrical sockets to receive a source of electricity from a power grid. Although the description of exemplary embodiments is provided below in conjunction with a particular type of EV plug connector and EV plug receptacle, alternate embodiments of the invention may be applicable to other types and configurations of EV plugs and receptacles. The invention may be better understood by reading the following description of non-limiting, exemplary embodiments with reference to the attached drawings, wherein like parts of each of the figures are identified by like reference characters, and which are briefly described as follows.

Figure 3A:
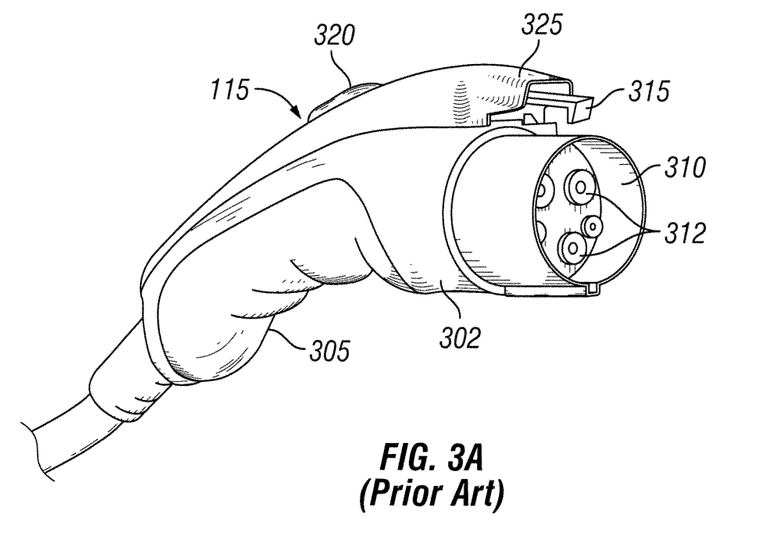
FIGS. 3A and 3B are a conventional plug connector and plug inlet in accordance with the prior art.
Figure 3B:
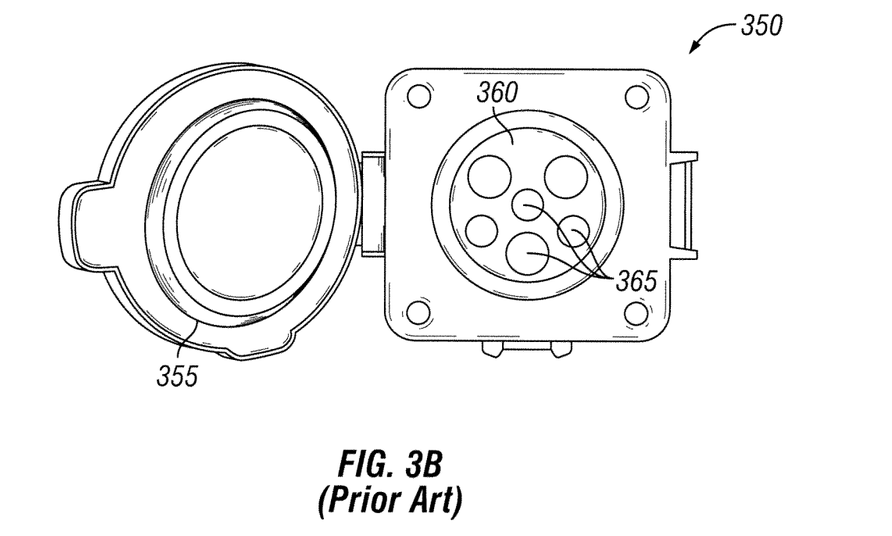

FIGS. 3A and 3B illustrate a conventional EV plug connector 115 and EV plug receptacle 350 in accordance with the prior art. In one exemplary embodiment, the EV plug connector 115 and the EV plug receptacle meet the SAE J1772 standard. Alternatively, other EV plug connector and plug receptacle designs can be used. The exemplary plug connector 115 includes a body 302 that can be made of plastic or other non-conductive materials. The EV connector 115 also includes a handle 305 coupled to the body 302. In certain exemplary embodiments, the handle 305 and body 302 are integrally formed. The exemplary handle can include multiple raised sections separated by flat or gently curving sections to provide a form-fitting feel when the fingers of a hand grasp the handle 305.

The EV connector 115 also includes a terminal interface 310. In one exemplary embodiment, the terminal interface includes one or more terminal receptacles 312 for receiving one or more terminals 365 positioned within the EV plug receptacle 350. The exemplary EV connector 115 also includes a latching member 315 positioned generally above the terminal interface 310. In certain exemplary embodiments, the latching member 315 is hingedly coupled to another portion of the EV connector 115 to allow the latching member 315 to move along the vertical access when coupling or decoupling the EV connector 115 to the EV plug receptacle 350. In certain exemplary embodiments, the latching member 315 is sized and shaped to be slidably inserted into the latching chamber 360 of the EV plug receptacle 350. The exemplary latching member 315 secures the EV connector 115 to the EV receptacle 350 on a vehicle. In certain exemplary embodiments, sensors or contacts may be electrically or communicably coupled to the latching member to determine when the latching member 315 is engaged with or attached to the latching chamber 360 and the EV connector 115 is being securely held in place within the EV plug receptacle 350. In these exemplary embodiments, a controller may prevent electricity from flowing through the connector 115 and receptacle 350 and into the electric vehicle until a secure latching between the latching member 315 and the latching chamber 360 is determined or sensed.

The exemplary EV connector 115 also includes a manually adjustable button 320 positioned along an exterior of the connector housing 302 and mechanically coupled to the latching member 315. In certain exemplary embodiments, the button 320, when depressed or slid laterally along the housing 302 actuates or moves the latching member 315 in, for example a vertical direction to disengage the latching member 315 from the latching chamber 360. Alternatively or in addition to that described above, activation or adjustment of the button can engage or couple the latching member 315 to the latching chamber 360. In one exemplary embodiment, the latching member 315 and button 320 are located at opposite ends of a lever (not shown) which pivots inside the housing 302 at a pivot point. In certain exemplary embodiments the lever is spring loaded within the housing 302 to bias the latching member 315 in the latched position. When a user presses the button 320, the lever pivots, thereby causing the latching member 315 to pivot, for example vertically, to enable the user to disengage the EV charging connector 115 from the EV charging receptacle 350.

The EV connector 115 also includes a cover member 325 coupled to or extending out from the housing 302. In one exemplary embodiment, the cover member 325 extends out over and covers all or a portion of the latching member 315 to protect the latching member 315 from damage. In certain exemplary embodiments, the cover member 325 is made from the same material as the housing 302 and is integrally formed with all or a portion of the housing 302.

In certain exemplary embodiments, the terminal interface 310 and the handle 305 are oriented at an angle, which in this example is about 160 degrees. This angle may affect the feel and operation of the EV connector 115 when it is connected to and removed from the EV charging receptacle 350. If the angle is too small or too big, it may not be difficult to use from an ergonomic perspective, requiring a user to position their arm or hand in an awkward or painful position to connect or disconnect the EV connector 115 to the EV charging receptacle 350 and may also put undue torque on the terminal receptacles 312 or terminals 365, thereby resulting in premature failure or misalignment between the receptacles 312 and the terminals 365.

Figure 4:
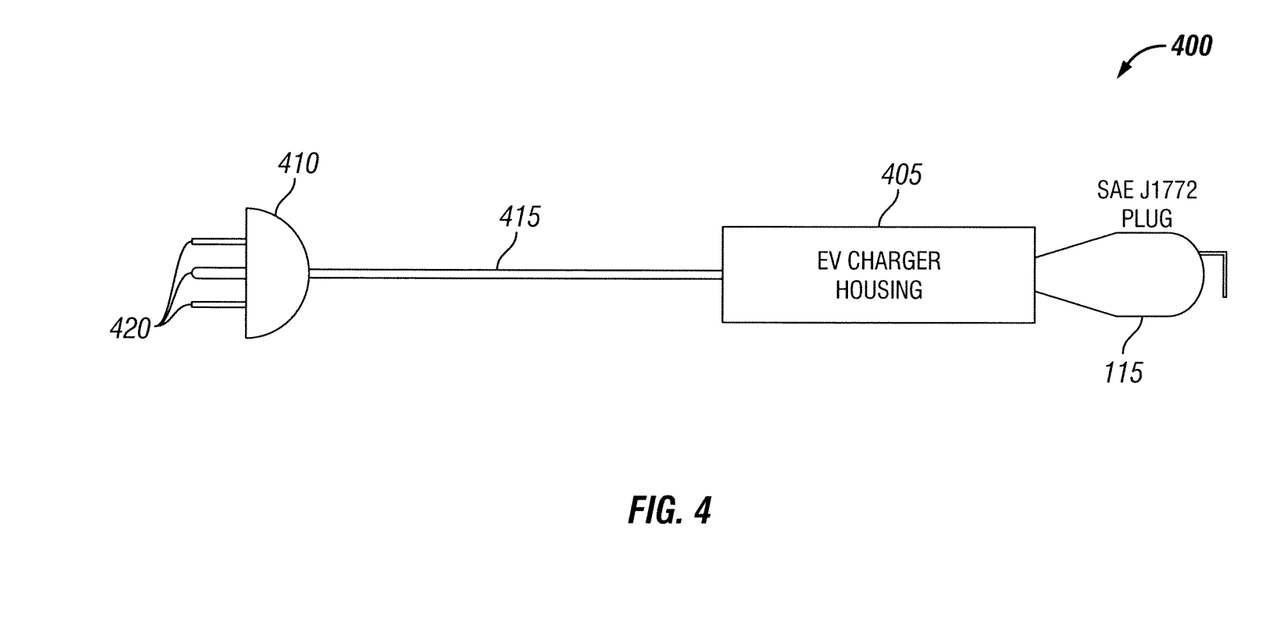
FIG. 4 is a schematic view of a portable EV recharging device in accordance with an exemplary embodiment.
Figure 5:
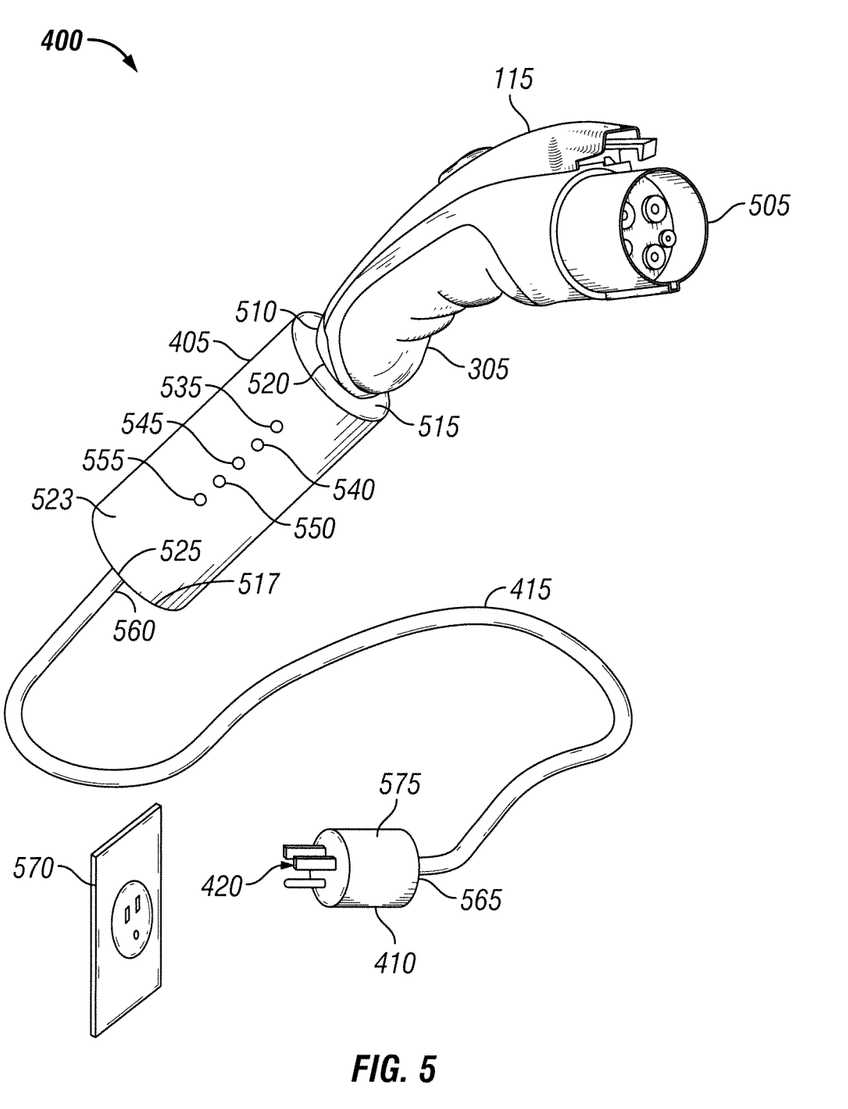
FIG. 5 is a perspective view of the portable EV recharging device in accordance with an exemplary embodiment.

FIG. 4 is a schematic view of a portable EV recharging device 400 according to certain exemplary embodiments. FIG. 5 is a perspective view of the portable EV recharging device 400 of FIG. 4. Referring now to FIGS. 3-5, the exemplary portable EV recharging device 400 includes an EV connector 115, an EV charger housing 405, a cable 415 and a plug 410. The exemplary EV connector 115 has a first end 505 that includes the terminal interface 310 discussed above in FIG. 3. The EV connector 115 also includes a second end 510 coupled to the EV charger housing 405. In certain exemplary embodiments, the EV connector 115 is directly coupled to the EV charger housing 405 along the second end 510. Alternatively, the EV connector 115 is rotatably coupled to the EV charger housing 405 as discussed in greater detail in FIG. 6 below. In yet another alternative embodiment, a portion of the EV charger housing 405 overlaps a portion of the EV connector 115, such as along the handle 305 and the EV charger housing 405 is coupled to the EV connector 115 at least one point along that overlap. In yet another alternative embodiment, a short cable (less than one foot long) (not shown) electrically and mechanically couples the EV charger housing 405 to the EV connector 115.

In the example of FIG. 5, the EV charger housing includes a first end 515 having a first aperture 520 for electrically coupling the EV connector 115 to the EV charger housing 405. The EV charger housing further includes a second end 517 having a second aperture 525 for electrically and mechanically coupling the cable 415 to the EV charger housing 405. While the exemplary embodiment of FIG. 5 shows the first end 515 and the second end 517 being opposing ends of the EV charger housing 405, the positioning of the electrical and mechanical connections shown can be along any portion of the EV charger housing 405 and, for example, can be on the same side of the housing 405.

The exemplary charger housing 405 has a bottom end, a top end and multiple walls, for example four side walls, connecting the top end and the bottom end to create an enclosure or cavity within the EV charger housing 405. Alternatively, the housing 405 can have any shape capable of providing an enclosure or cavity for the placement of electrical and/or electronic controls and components, including, but not limited to, a cylindrical shape. In certain exemplary embodiments, one or more of the sides or top or bottom ends of the EV charger housing 405 are removable or rotatable with respect to one or more of the other sides or top or bottom ends to provide access to the interior cavity of the EV charger housing 405. Easy access to the interior cavity of the EV charger housing 405 provides maintenance and diagnostic benefits in the event that problems occur with the device 400.

In certain exemplary embodiments, the EV charger housing 405 is made from high impact-resistant plastic, such as, for example, glass-filled nylon. Alternatively, the EV charger housing 405 can be made of metal, such as sheet metal, or other know materials for housing electrical components. Further, the EV charger housing 405 can include a rubber or other elastic material disposed over all or a portion of the outer exterior of the housing 405 to protect the housing 405, and the electrical components therein, during impact conditions.

The EV charger housing 405 may include relays, contactors, circuit boards, transformers, modules, lights, displays, charging circuits and/or any other components to implement an electric vehicle supply circuit such as a circuit for charging an electric vehicle with the EV connector 115. For example, one embodiment may include circuitry to implement an AC Level 1 charging device that operates from 120 VAC power and includes one or more indicator lights on the top panel 523 of the housing 405 to indicate the status of the power source, vehicle charge state, fault conditions, etc. As another example, a different embodiment of the EV charger housing 405 may include circuitry to implement an AC Level 2 charging device that operates from a dedicated source of 240 VAC power and includes an alphanumeric display with keypad and/or network capabilities (not shown). As a further example, in another embodiment the EV charger housing 405 may include a charging circuit with an AC/DC converter to implement a DC charging device.

The exemplary EV charger housing 405 houses electrical components for receiving electrical power from a power source 570 such as an electrical grid through a standard wall mounted electrical receptacle and providing that electrical power to an electric vehicle, though the EV connector 115. Examples of the types of electrical components that can be positioned with the EV charger housing are discussed in greater detail in FIG. 7. The EV charger housing 405 also includes one or more visual indicators 535-555. In one exemplary embodiment, the visual indicators 535-555 are lights. For example, the visual indicators 535-555 can include light emitting diodes or other light sources. In this example, the visual indicators 535-555 can further include an opaque, transparent or partially transparent lens or cover over all or each of the visual indicators 535-555. The lens or cover can further be tinted a desired color, such as green, yellow, red, white, etc. to help further convey the information provided by the visual indicator. In certain exemplary embodiments, the visual indicators 535-555 include, but are not limited to, a power on indicator 535, a missing ground indicator 540, a charging indicator 545, a ready indicator 550, and a finished indicator 555.

In certain exemplary embodiments, the power on indicator 535 provides a visual indication that the device 400 is connected to a power grid through the male plug 410 and is receiving electrical power. In certain exemplary embodiments, the charging indicator provides a visual indication that the EV connector 115 is connected to the EV charging receptacle 350 and is currently charging the batteries of the electric vehicle. The exemplary ready indicator 550 provides a visual indication that the EV connector 115 is receiving electrical power and is ready to be coupled to the EV charging receptacle 350 to provide electrical power to the batteries of the electric vehicle. The exemplary finished indicator 555 provides a visual indication that the charging sequence has been completed.

The exemplary cable or electric cord 415 electrically has a first end 560 and a distal second end 565. The exemplary cable 415 is coupled to the plug 410 at the second end 565 and coupled to the EV charger housing 405 at the first end 560 to electrically couple the plug to one or more electrical components within the housing 405. In one exemplary embodiment, the cable 415 is of any type suitable for plugging the device 400 into a standard 110V or 220V power outlet receptacle 570 and transmitting that power from the plug 405 to the EV connector 115. The device further includes a plug 410. The plug can be of any form suitable for plugging into one or more types of standard surface-mounted receptacles 570. Examples of the types of plug 410 that could be incorporated into the device 400 include, but are not limited to, those that satisfy the NEMA 1, 5, 6, 14, L5, L6, and L14 standards. The plug 410 typically includes an outer housing 575 to seal and prevent access to the electrical connections therein multiple plug terminals 420 that are designed to be removable inserted into a corresponding surface-mounted, for example, plug receptacle 570.

Figure 6:
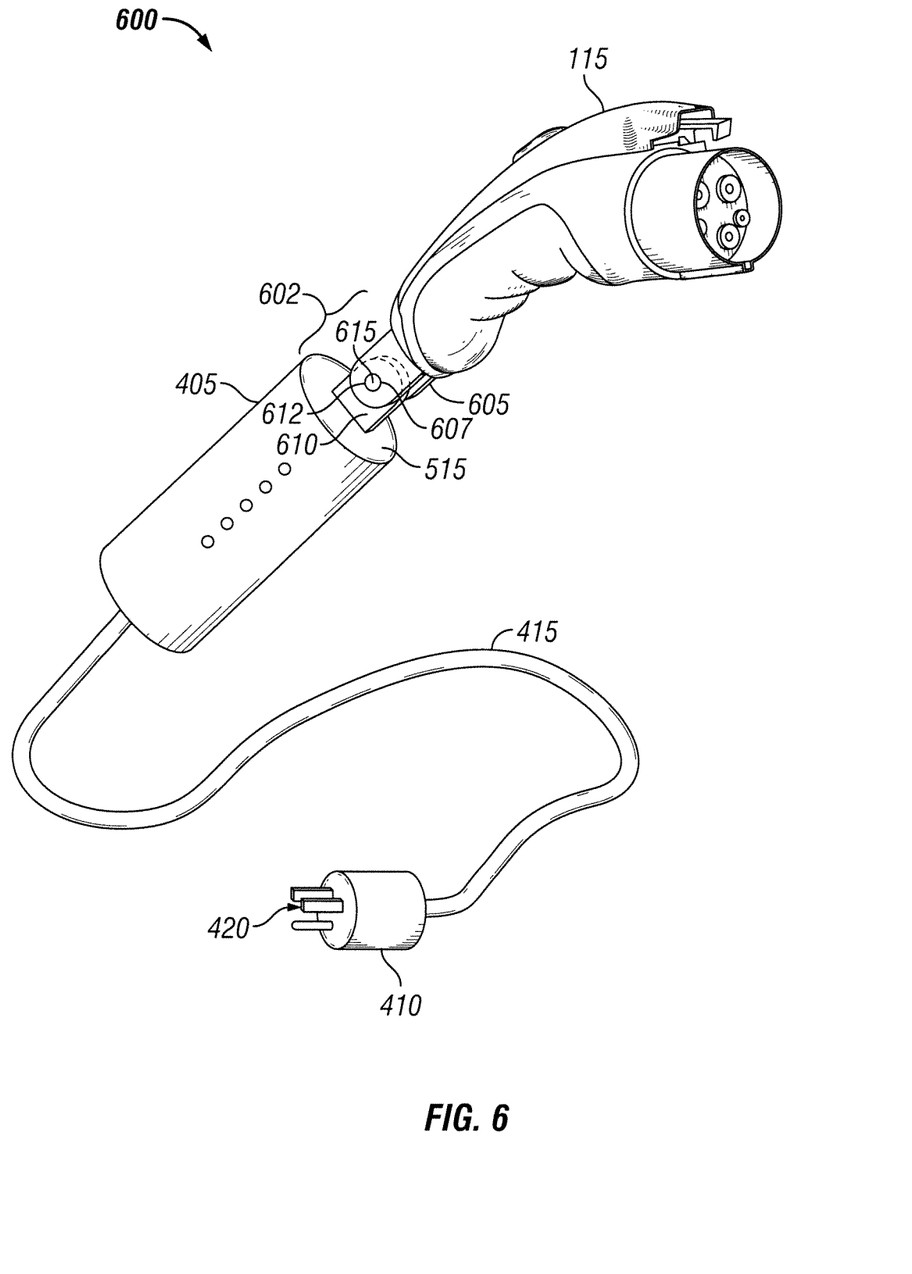
FIG. 6 is a perspective view of an alternative portable recharging device in accordance with another exemplary embodiment.

FIG. 6 is a perspective view of an alternative portable recharging device 600 according to one exemplary embodiment. Referring now to FIGS. 3A-3B, 4, and 6, the exemplary recharging device 600 is substantially similar to the device 400 described with reference to FIG. 5. Only the differences will be discussed herein for the sake of brevity. In the device 600, the EV charger housing 405 is positioned immediately next to and is rotatably coupled to the EV connector 115. Rotatably connecting the EV charger housing 405 to the EV connector 115 can provide improved ergonomics and reduce them amount of torque at the terminal interface 310 when the EV connector 115 is coupled to the EV charging receptacle 350.

In one exemplary embodiment, the EV connector 115 is rotatably connected to the EV charger housing a rotating joint system 602. Alternatively, other devices and systems for rotatably connecting one device to another can be used. In the embodiment of FIG. 6, the EV connector 115 includes a first rotating connector 605 positioned generally opposite the terminal interface 310. In certain exemplary embodiments, the first portion 605 is part of the housing 302 or handle 305 of the EV connector 115. Alternatively, the first portion 605 is an add-on member that is coupled to the EV connector 115. The first rotating connector 605 includes a hole, opening, or aperture 607 providing a passageway though the first rotating connector 605.

The first end 515 of the EV charger housing 405 includes a second rotating connector 610 extending generally out from the first end 515 of the EV charger housing 405. The second rotating connector 610 includes a hole, opening, or aperture 612 providing a passageway though the first rotating connector 610. The two apertures 607, 612 are aligned and a pin 615 is inserted into the apertures 607, 612, such that the EV charger housing 405 and the EV connector rotate with respect to one another about the pin 615. In certain exemplary embodiments, the pin 615, first rotating connector 605 and second rotating connector 610 are made from the same material, such as steel or any other type of metal or durable plastic.

Figure 7:
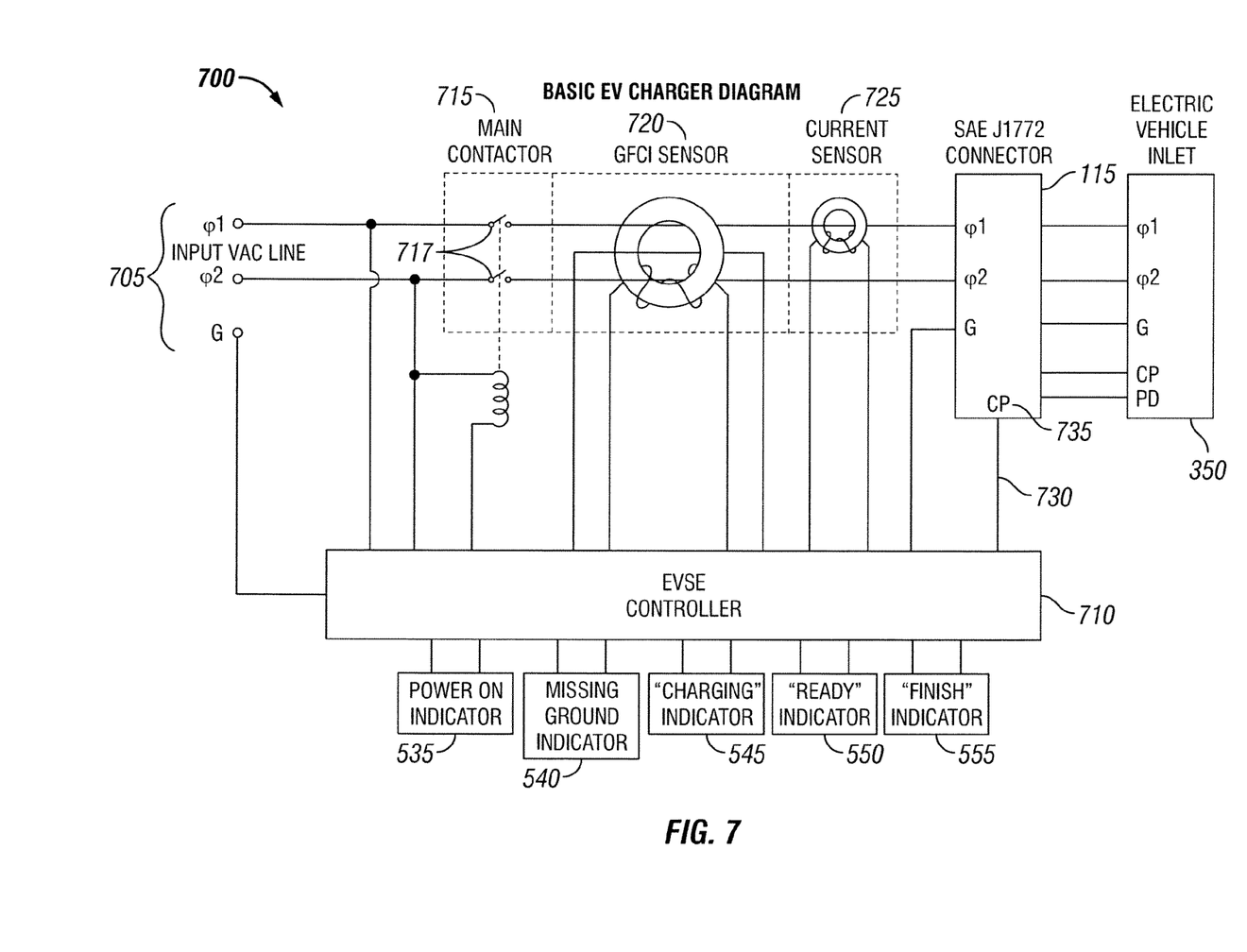
FIG. 7 is a schematic view of the electrical circuitry for the portable recharging device of FIGS. 4-6 in accordance with one exemplary embodiment.

FIG. 7 is a schematic view of the electrical circuitry for the portable recharging device of FIGS. 3-6 according to one exemplary embodiment. Now referring to FIGS. 3-7, electrical power is provided by a power source 705 which may include any suitable type of AC and/or DC power source. In the exemplary embodiment of FIG. 7, the power source 705 is an AC power source, but with modifications known to those of ordinary skill in the art, a DC power source could be substituted. The power flows from the exemplary surface-mounted receptacle 570 to the device 400, 600 through the plug 410 and the cable 415, to the electrical components in the EV charger housing 405. The electrical components within the EV charger housing 405 can include, but are not limited to, an EVSE controller 710 electrically and/or communicably coupled to a main contactor circuit 715, a ground fault circuit interrupter (GFCI) sensor 720, and a current sensor 725. These components may be reordered and/or rearranged in any suitable manner.

The main contactor circuit 715 is arranged to close the circuit between the power source 705 and the EV charger connector 115 in response to a signal received from the controller 710. In certain exemplary embodiments, the main contactor circuit 715 also includes a contact monitor that generates an output signal to the controller 710 in response to the state of one or more switches 717 in the main contactor circuit 715.

The GFCI sensor and interrupter 720 monitors the differential current through the current carrying conductors and changes the state of the output signal if the differential current exceeds a threshold. In certain exemplary embodiments, the GFCI sensor 720 includes a manual test input that allows the GFCI sensor to be tested manually. Further, the exemplary GFCI sensor 720 may also include a manual reset input which allows the GFCI sensor 720 to be reset manually. In certain exemplary embodiments, the manual test input and manual reset input are manually adjustable buttons that can be provided, for example, along the outer surface of the EV charger housing 405. In certain exemplary embodiments, the connections between the controller 710 and the GFCI sensor 720 further include an automatic test input and an automatic reset input which allow the controller 262 to automatically test and reset the GFCI sensor 720.

The GFCI sensor 720 acts as a charging circuit interrupting device, which is required to disconnect the source of power 705 if the difference between the current flowing in the current-carrying conductors (differential current) exceeds a predetermined threshold, which is essentially the same operating principle as a common ground fault circuit interrupter (GFCI) which is typically designed to interrupt the flow of power (trip) if the differential current exceeds 5 milliAmps (mA). Any differential current is usually assumed to be caused by a ground fault which may present an electrocution hazard.

In the case of EV charging devices, however, 5 mA may be an unacceptably low trip point, thereby causing excessive nuisance tripping that interrupts the charging process. Therefore, UL standards allow a CCID to have a trip point of 20 mA if the system is equipped with a grounding monitor that interrupts the power circuit if it detects an inadequate grounding circuit. UL standards also require a CCID to allow for manual testing or automatic testing before each operation. Such grounding monitor circuit may optionally be included in the circuit 700. The grounding monitor circuit monitors the continuity of a grounding conductor and generates an output signal to the controller 710 in response to the state of the grounding conductor.

The exemplary circuit 700 further includes a control pilot connection 730 between the control pilot 735 of the EV connector 115 and the controller 710. In one exemplary embodiment, the control pilot connection 730 provides a signal or in some other manner provides information to the controller 710 that allows the controller 710 to determine whether the EV connector 115 is coupled to the EV charger receptacle 350 on the electric vehicle and to determine if the vehicle is ready to receive power. In addition, the control pilot connection 730 provides a messaging pathway for the controller 710 to communicate with the electric vehicle the current capacity of the supply circuit to the vehicle.

The controller 710 may be configured to communicate and complete any or all of the features described above. In addition, the controller is communicably coupled to one or more additional outputs, such as the visual indicators 535-555. Upon detection of the particular indicator, the controller 710 sends a signal to the particular visual indicator, or device controlling the visual indicator, to energize or turn on. For example, if the device 400 is plugged into a receptacle 570 and is receiving electrical power, the controller 710 can send a signal to energize the power on indicator 535 and the ready indicator 550. Further, when the EV connector 115 is initially and properly inserted into the EV charging receptacle 350 for an electrical vehicle that needs to be charged, and for which a charge session has been initiated, the controller 710 sends a signal to energize the charging indicator 545. Once the controller 710 receives a signal that the charge is complete, such as through the control pilot connection 735, the controller sends a signal to energize the finish indicator 555 and de-energize the charging indicator 545.

Figure 8A:
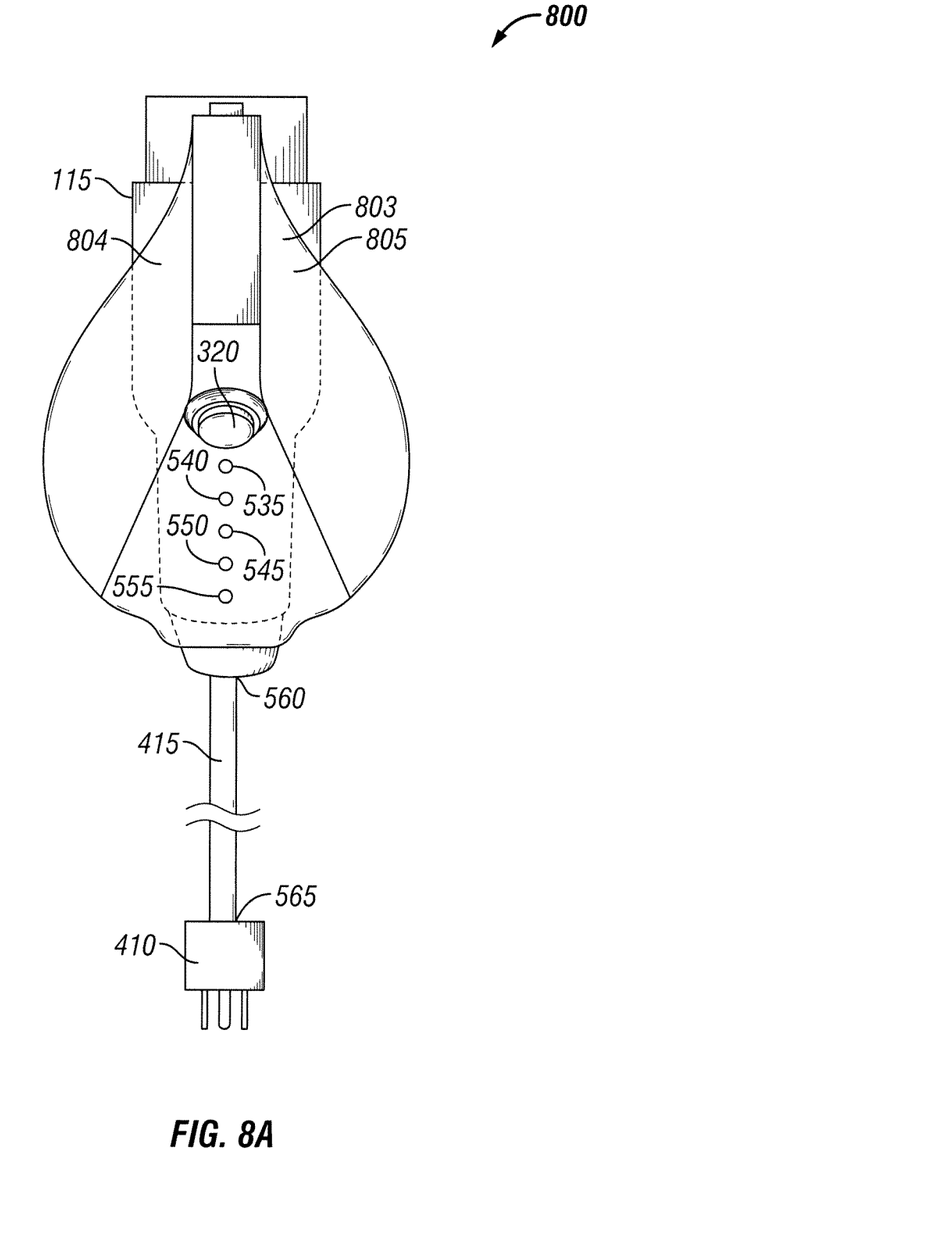
FIGS. 8A and 8B are various views of another portable EV recharging device in accordance with another exemplary embodiment.
Figure 8B:
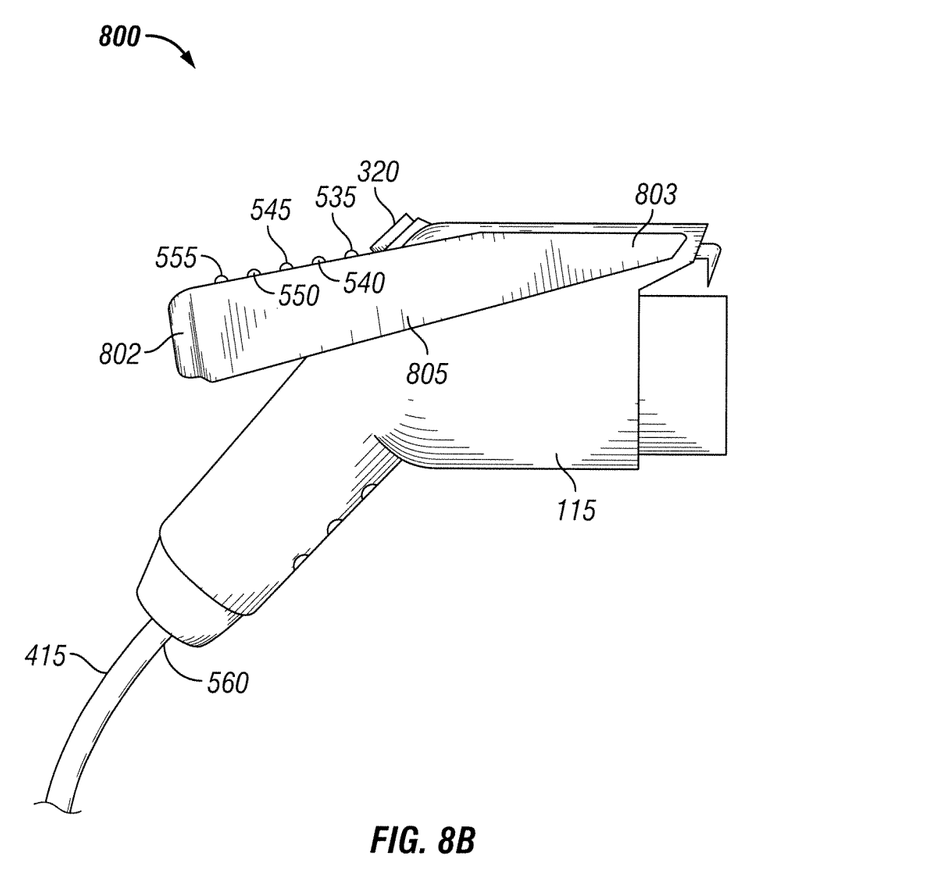

FIGS. 8A and 8B are top and side views, respectively, of another alternative portable recharging device 800 according to one exemplary embodiment. Referring now to FIGS. 3A-3B, 4, and 8, the exemplary recharging device 800 is substantially similar to the device 400 described with reference to FIG. 5. Only the differences will be discussed herein for the sake of brevity. In the device 800, the EV charger housing 805 is positioned on top of or is incorporated into, such as being integrally formed with or fasted thereto with screws or rivets to, a top side of the EV connector 115. Coupling or integrally forming the EV charger housing 805 to the EV connector 115 can provide improved use of space, less material usage and overall better ergonomics.

In one exemplary embodiment, the EV charger housing 805 and the EV connector 115 are both made of plastic and coupled together. Alternatively, other devices and systems for connecting one device to another can be used. In the exemplary embodiment of FIG. 8, the EV housing 805 has a first portion 803 extending alongside an upper portion of the EV connector 115 adjacent to the right side of the latching member 315 and the cover member 325 and a second portion 804 extending alongside an upper portion of the EV connector 115 adjacent to the left side of the latching member 315 and the cover member 325.

The EV housing 805 also includes a rear portion 802 generally positioned below the manually adjustable button 320 and extending out from the top side of the handle 305 portion of the EV connector 115. In certain exemplary embodiments, the rear portion 802 is a housing that includes an enclosed cavity for the placement of electrical and/or electronic controls and components, such as all or portions of those described in FIG. 7. In alternative embodiments, the rear portion 802, first portion 803 and second portion 804 all define and include the enclosed cavity for the placement of electrical and/or electronic controls and components, such as all or portions of those described in FIG. 7.

The exemplary cable or electric cord 415 has a first end 560 and a distal second end 565. The exemplary cable 415 is coupled to the plug 410 at the second end 565 and mechanically coupled to the EV connector 115 at the first end 560 and electrically coupled, by way of a cavity in the handle 305 and the cavity of the EV housing 805 to the electrical components within the EV housing 805, to electrically couple the plug to one or more electrical components within the housing 805. In one exemplary embodiment, the cable 415 is of any type suitable for plugging the device 800 into a standard 110V or 220V power outlet receptacle and transmitting that power from the plug 410 to the EV connector 115. The device 800 further includes a plug 410. The plug 410 can be of any form suitable for plugging into one or more types of standard surface-mounted receptacles. Examples of the types of plug 410 that could be incorporated into the device 800 include, but are not limited to, those that satisfy the NEMA 1, 5, 6, 14, L5, L6, and L14 standards.

The exemplary EV charger housing 805 houses electrical components for receiving electrical power from a power source, such as an electrical grid through a standard wall mounted electrical receptacle, and providing that electrical power to an electric vehicle, though the EV connector 115. Examples of the types of electrical components that can be positioned within the EV charger housing 805 are discussed in greater detail in FIG. 7. The EV charger housing 805 also includes one or more visual indicators 535-555. In one exemplary embodiment, the visual indicators 535-555 are lights. For example, the visual indicators 535-555 can include light emitting diodes (LEDs) or other light sources. In this example, the visual indicators 535-555 can further include an opaque, transparent or partially transparent lens or cover over all or each of the visual indicators 535-555. The lens or cover can further be tinted a desired color, such as green, yellow, red, white, etc. to help further convey the information provided by the visual indicator. In certain exemplary embodiments, the visual indicators 535-555 include, but are not limited to, a power on indicator 535, a missing ground indicator 540, a charging indicator 545, a ready indicator 550, and a finished indicator 560.

Although each exemplary embodiment has been described in detail, it is to be construed that any features and modifications that are applicable to one embodiment are also applicable to the other embodiments. Although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. An electric vehicle recharging system comprising:
    an electric vehicle connector comprising:
        a first end configured to be coupled to a receptacle on an electric vehicle; and
        a second end coupled to a first rotating connector;
    a charger housing coupled to a second rotating connector and comprising an electric vehicle charging circuit disposed within the charger housing,
        wherein the first rotating connector is coupled to the second rotating connector to rotatably couple the charger housing to the electric vehicle connector;
    a power cable comprising a first end and a distal second end, the first end of the power cable coupled to the electric vehicle charging circuit of the charger housing; and
    an electrical plug coupled to the second end of the power cable.

2. The system of claim 1,
    wherein the charger housing comprises a first end and an opposing second end,
    wherein the first end of the charger housing is coupled to the second rotating connector, and
    wherein the second end of the charger housing is coupled to the first end of the power cable.

3. The system of claim 1, wherein the electric vehicle charging circuit comprises:
    a controller;
    a contactor circuit communicably coupled to the controller; and
    a ground fault circuit interrupter circuit communicably coupled to the controller.

4. The system of claim 1, wherein the charger housing comprises:
   a top end;
   a bottom end; and
   a plurality of sides extending from the top end and the bottom end,
      wherein the top end, bottom end, and plurality of sides define a cavity within which the electric vehicle charging circuit is disposed.

5. The system of claim 4, wherein the top end is adjustable from an open position to a closed position to provide access to the cavity.

6. The system of claim 1 wherein the charger housing further includes a plurality of visual indicators positioned along an outer surface of the charger housing.

7. The system of claim 1, wherein the electrical plug comprises a NEMA class 1 configuration male plug.

8. The system of claim 1, wherein the electrical plug comprises a NEMA class 5 configuration male plug.

9. The system of claim 1, wherein the electrical plug is configured to be removably coupled to a 110 VAC surface-mounted plug receptacle.

10. The system of claim 1, wherein the electrical plug is configured to be removably coupled to a 220 VAC surface-mounted plug receptacle.

11. An electric vehicle recharging system comprising:
   an electric vehicle connector comprising:
      a first end comprising a terminal interface comprising a plurality of conductive terminals configured to be coupled to a receptacle on an electric vehicle; and
      a second end comprising a handle;
   a charger housing rotatably coupled to the electric vehicle connector using a rotating joint mechanism, wherein the charger housing comprises an electric vehicle charging circuit disposed within the charger housing;
   a power cable comprising a first end and a distal second end, the first end of the power cable coupled to the electric vehicle charging circuit; and
   an electrical plug coupled to the second end of the power cable.

12. The system of claim 11,
   wherein the rotating joint mechanism comprises:
      a first rotating connector coupled to the second end of the electric vehicle connector, the first rotating connector comprising a first aperture providing a passageway through the first rotating connector;
      a second rotating connector coupled to the charger housing, the second rotating connector comprising a second aperture providing a passageway through the second rotating connector; and
   wherein the rotating joint mechanism further comprises a pin disposed though the first aperture and the second aperture, the charger housing being rotatable about the pin with respect to the electric vehicle connector.

13. The system of claim 11, wherein the electrical plug is selected from the group consisting of NEMA class 1 male plugs, NEMA class 2 male plugs, NEMA class 5 male plugs, NEMA class 6 male plugs, NEMA class 14 male plugs, NEMA class L5 male plugs, NEMA class L6 male plugs, and NEMA class L14 male plugs.

14. The system of claim 11, wherein the charger housing comprises a first end and an opposing second end, wherein the first end of the charger housing is rotatably coupled to the second end of the electric vehicle connector via the rotating joint mechanism, and wherein the second end of the charger housing is coupled to the first end of the power cable.

15. The system of claim 11, wherein the electric vehicle charging circuit comprises:
   a controller;
   a contactor circuit electrically coupled to the controller;
   a ground fault circuit interrupter circuit electrically coupled to the controller; and
   a current sensor circuit electrically coupled to the controller.

16. The system of claim 15, wherein the electric vehicle charging circuit further comprises a control pilot connection electrically coupled at one end to the controller and at an opposing end to the electric vehicle connector.

17. The system of claim 11, wherein the charger housing comprises a plurality of exterior surface walls, the walls defining an inner cavity of the charger housing.

18. The system of claim 17, wherein the electric vehicle charging circuit is coupled to the charger housing and disposed within the inner cavity.

19. The system of claim 11, further comprising a plurality of light emitting visual indicators disposed along an exterior surface of the charger housing, wherein each of the light emitting visual indicators provides a visual indication of a status of the electric vehicle recharging system.

20. An electric vehicle recharging system comprising:
   an electric vehicle connector comprising:
      a first end comprising a terminal interface, wherein the terminal interface comprises a plurality of conductive terminals configured to be coupled to a receptacle on an electric vehicle; and
      a second end comprising a handle;
   a charger housing rotatably coupled to and positioned adjacent to the electric vehicle connector, wherein the charger housing comprises an electric vehicle charging circuit disposed within the charger housing;
   a plurality of light emitting visual indicators disposed along an exterior surface of the charger housing, wherein each of the light emitting visual indicators provides a visual indication of a status of the electric vehicle recharging system;
   a power cable comprising a first end and a distal second end, the first end of the power cable coupled to the electric vehicle charging circuit; and
   an electrical plug coupled to the second end of the power cable.

* * * * *